United States Patent [19]

Asai et al.

[11] Patent Number: 5,131,778
[45] Date of Patent: Jul. 21, 1992

[54] COUPLING STRUCTURE AND METHOD OF RESIN MOLDINGS

[75] Inventors: Shingo Asai; Katsumi Nakajima; Akihiko Matsumoto, all of Osaka, Japan

[73] Assignee: Minolta Camera Kabushiki Kaisha, Osaka, Japan

[21] Appl. No.: 653,866

[22] Filed: Feb. 8, 1991

Related U.S. Application Data

[63] Continuation of Ser. No. 208,961, Jun. 20, 1988, abandoned.

[30] Foreign Application Priority Data

Jun. 19, 1987 [JP] Japan .................. 62-152517

[51] Int. Cl.⁵ ................................ F16B 1/00
[52] U.S. Cl. ...................... 403/24; 403/339; 403/267; 403/340
[58] Field of Search ............... 403/265–268, 403/272, 339, 340, 24; 164/111; 249/83, 85, 122, 144–145, 149; 425/110–117, 127, 129; 354/288 M, 288 U, 288 H; 264/259; 428/259, 264, 265

[56] References Cited

U.S. PATENT DOCUMENTS

| | | | |
|---|---|---|---|
| 4,155,478 | 5/1979 | Ogi | 403/268 X |
| 4,201,209 | 5/1980 | LeVeen et al. | 264/259 X |
| 4,318,604 | 3/1982 | Kobori | 354/288 |
| 4,417,796 | 11/1983 | Sugiura et al. | 354/288 X |
| 4,584,155 | 4/1986 | Zanella | 264/259 X |

FOREIGN PATENT DOCUMENTS 2024082 12/1971 Fed. Rep. of Germany.
2614574 11/1988 France.
1336613 11/1973 United Kingdom.

*Primary Examiner*—Andrew V. Kundrat
*Attorney, Agent, or Firm*—Price, Gess & Ubell

[57] ABSTRACT

A coupling structure and a method of coupling resin structures wherein a first member is coupled with a thermoplastic second member through a coupling force produced by constricting the volume of the resin during molding and/or the generation of an undercut structure. The undercut structure results from the deformation of a projection member caused by the flow pressure and temperature of the resin. A recess is provided in one of the members. The recess is indented in the laying direction. On the other member, a projection is provided which enters the recess. The coupling of the two members is therefore simple and does not require the use of a subsidiary material. Additionally, when an undercut structure is formed, extremely strong coupling is obtained. Since the undercut is formed by deformation of the projection, no undercut structure is required to be formed on the die, so that no extra cost or burden has to be forced on the die.

34 Claims, 20 Drawing Sheets

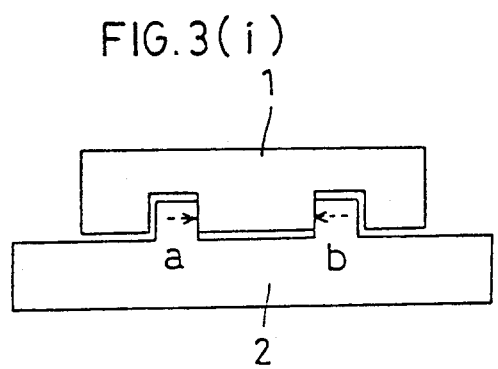
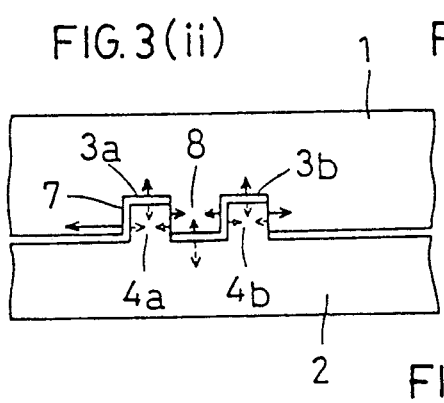
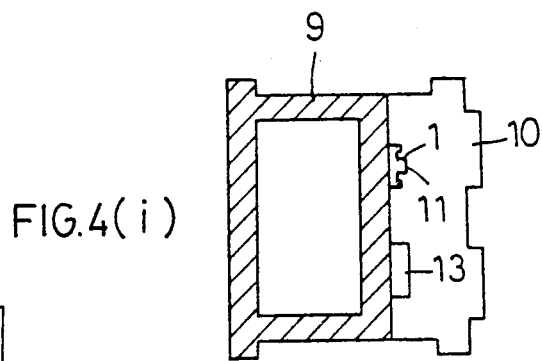
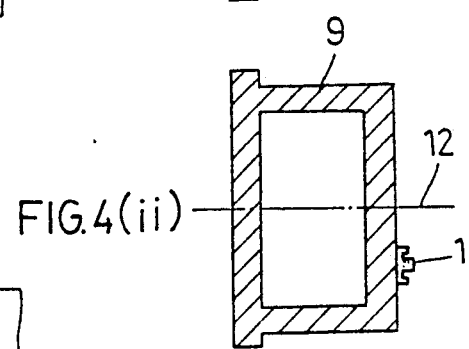
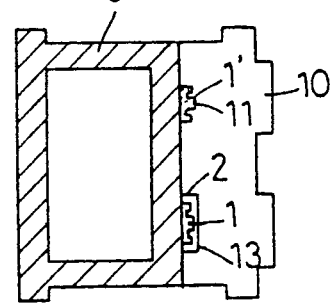
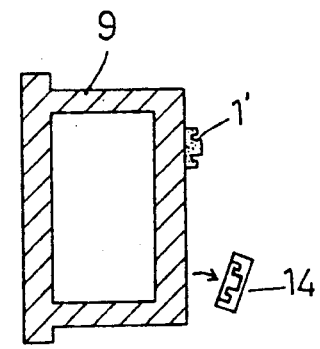

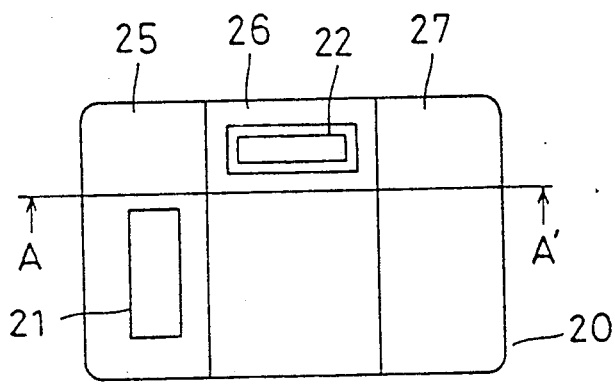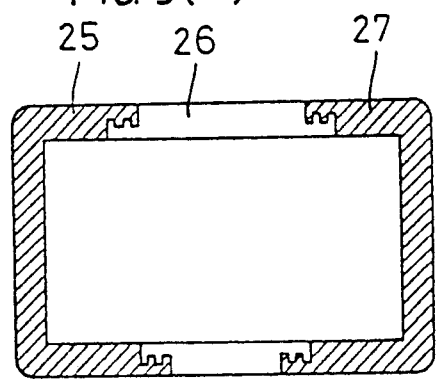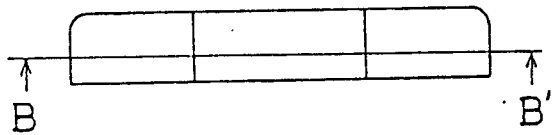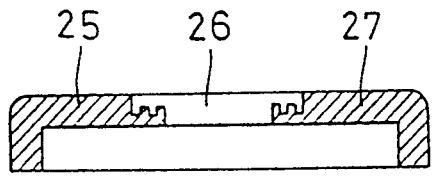

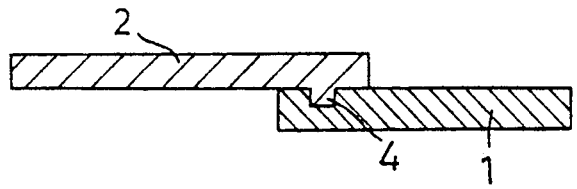
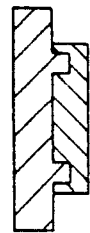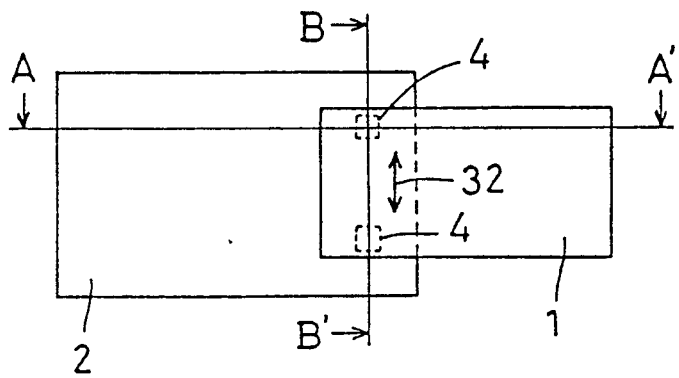
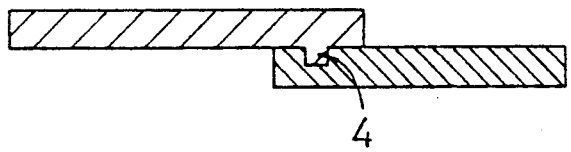
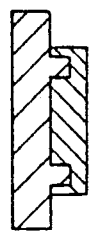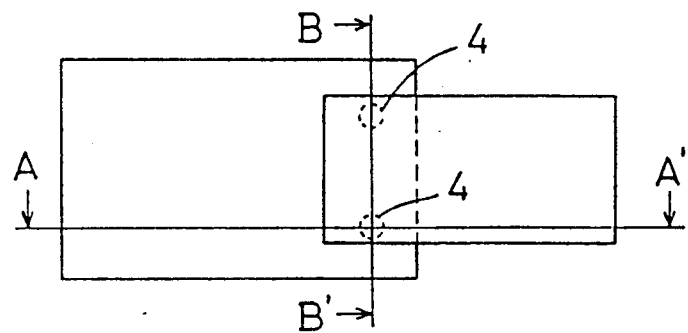

FIG. 19(a)
FIG. 19(c)
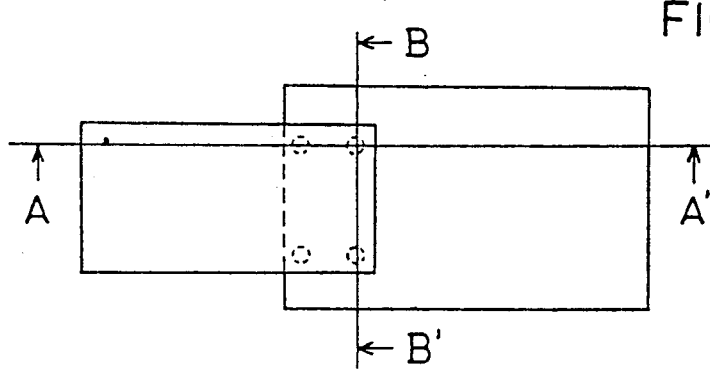
FIG. 19(b)
FIG. 20(a)
FIG. 20(c)
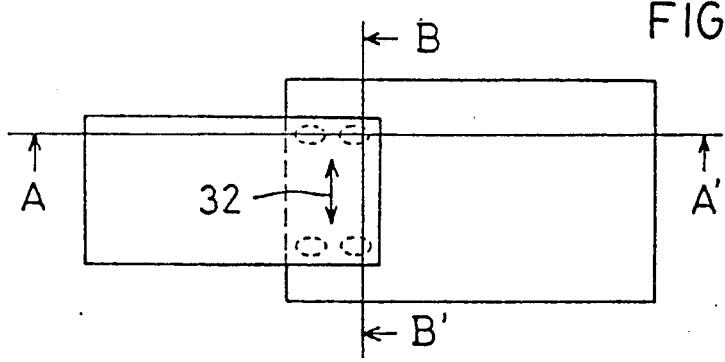
FIG. 20(b)
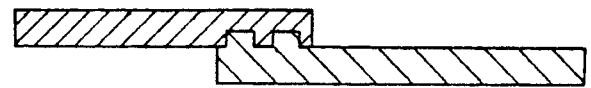

FIG. 21(a)
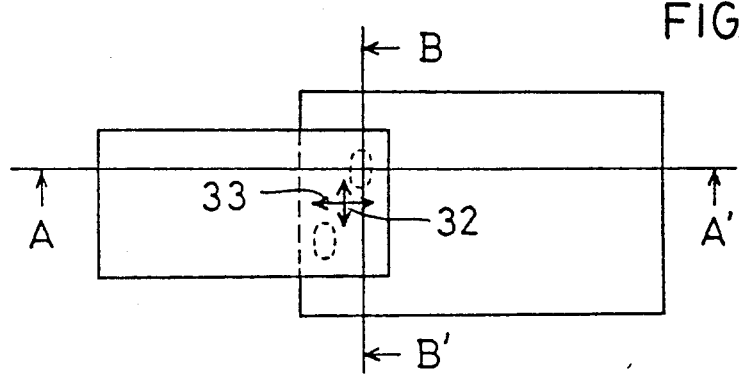
FIG. 21(c)
FIG. 21(b)
FIG. 22
| COLORLESS TRANSPARENT MATERIAL | COLORED (TRANSPARENT OPAQUE) MATERIAL |
|---|---|
| PMMA | PC |
| AS | ABS |
| PC | PC+ABS (alloy) |
|  | POM |
|  | AS |
|  | PBT |

RESIN TEMPERATURE

▨ NG
▭ OK
→ Flow Direction of Resin

COUPLING STRUCTURE AND METHOD OF RESIN MOLDINGS

This is a continuation of application Ser. No. 208,961, filed on Jun. 20, 1988, now abandoned, for a coupling structure and method of resin moldings.

BACKGROUND OF THE INVENTION

1. Field of the Invention

The present invention relates to a coupling structure for a pair of members at least one of which is a resin molding member and a coupling method thereof.

2. Description of the Prior Art

The coupling structure and the coupling method to be herein referred to will be illustrated below with reference to exterior parts such as an exterior cover of a camera and a transparent plate to be coupled therewith.

As shown in FIG. 30, on a front cover 34 of a camera there are provided a lens cover window 35, a view finder objective window 36, a flashing section window 37 of an electronic flash unit, etc., with which the respectively designated molded members are coupled. As to their coupling structure there exist several coupling methods shown in FIGS. 31(a) to 31(d) with respect to the lens cover window 35.

Firstly, one of those structures is, as shown in FIG. 31(a), a coupling structure by integration of parts in insert molding. That is to say, on the whole periphery of a transparent plate 38 as an assembling part of an undercut is provided, and with the transparent plate 38 held in a die, resin is poured therearound to form a front cover 34, thereby coupling the front cover 34 with the transparent plate 38.

Secondly, there is a structure as shown in FIG. 31(b) made by applying an adhesive 39 to the whole periphery of the transparent plate 38 so that the front cover 34 can be integrated with the transparent plate 38.

Third, there is a thermal fusing coupling structure of applying a supersonic wave to the engaging part between the transparent plate 38 and the front cover 34, thereby partially fusing the peripheral part thereof.

Now, in the case of water-proof cameras, with respect to the relation between the front cover 34 and the transparent plate 38 as above, it is required not merely to couple two things together but also to couple them so as to produce a water-proof effect to the coupled product. To this end, the application of an adhesive in FIG. 31(b) or the thermal fusing in FIG. 31(c) is normally provided over the whole periphery of the coupling part. From the view point of waterproofing as above, there may be given a structure to use packings 40, 41 as in FIG. 31(d). In this structure, the front cover 34 and an auxiliary cover 42 are respectively provided with recesses, and, with packings 40, 41 fitted into these recesses, the front cover 34 and the auxiliary cover 42 are coupled together in an appropriate method.

However, the aforementioned structures FIGS. 31(b) and 31(d) have disadvantages in requiring subsidiary materials such as adhesives, packings (sealing material), involving extremely poor efficiency of assembling work. The structure (c) necessitates a fusing process of applying a separate energy of heat to a resin molding product. Moreover, these coupling structures FIGS. 31(b), (c), and 31(d) cannot be realized before preparing in advance the two molding materials to be coupled. As to the coupling structure FIG. 31(a), although coupling is performed in a die for molding one of the molding materials, it is by all means necessary as its premise to prepare the assembling part.

As reviewed above, conventional coupling structures have had drawbacks in requiring many assembling steps and subsidiary materials and in automatization of assembling work and curtailment of part items. Moreover, since the highest strength is obtained in, for example, the structure FIG. 31(a) when the wall thickness $L_1$ of the undercut part is selected to be $\frac{1}{3}$ of the whole wall thickness t (ref. FIG. 32), particularly in the case of a generally thin-type member, the undercut part has to be made extremely thin, with the result that it has insufficient strength.

SUMMARY OF THE INVENTION

It is an object of the present invention to provide a coupling structure and a coupling method in which the work of coupling the two members is simple and does not require use of a subsidiary material.

Another object of the present invention is to provide a coupling structure and a coupling method in which strong coupling can be obtained.

Briefly speaking, the present invention couples a first member with a thermoplastic second member by utilizing a coupling force produced by constricting the volume of resin during the molding of the resin and/or generation of an undercut structure resulting from deformation of a member caused by the flow pressure of resin and the resin temperature. On one of the first member and the second member a recess indented in the laying direction is provided, and on the other of them a projection to enter into the above recess is provided.

Therefore, according to the present invention, coupling of the two members is achieved simultaneously with molding of the second member. As this system does not necessitate the use of an adhesive or subsidiary material such as packing or separate energy such as supersonic wave for coupling, it can largely contribute to automatization of the work due to the small number of work steps and parts. Additionally, the coupling structure which includes a tight contact bond on at least one surface of the projection and recess has a waterproof effect. Furthermore, when an undercut structure is formed on the coupling part, extremely strong coupling is obtained. And, as the undercut is formed by deformation of the projection of the first member, no undercut structure is required to be formed on the die, so that no extra cost or burden has to be forced on the die.

BRIEF DESCRIPTION OF THE DRAWINGS

These and other objects and features of the present invention will become apparent from the following description taken in conjunction with preferred embodiment thereof with reference to the accompanying drawings, throughout which like parts are designated by like reference numerals, and in which:

FIGS. 8(a) to 8(d), FIGS. 9(a) to 9(d), and FIGS. 10(a) and 10(b) are respectively views showing the cases where the present invention is applied to the rear cover of a camera, FIGS. 13(a) to 13(c), FIGS. 14(a) to 14(c), FIGS. 15(a) to 15(c), FIGS. 16(a) to 16(c), FIGS. 17(a) to 17(c), FIGS. 18(a) to 18(c), FIGS. 19(a) to 19(c), FIGS. 20(a) to 20(c), and FIGS. 21(a) to 21(c) are views showing various patterns of the coupling structure of the present invention, FIG. 22 is an illustrative view on the resin to be used for the present invention.

DETAILED DESCRIPTION OF THE PREFERRED EMBODIMENT

Figure 1:
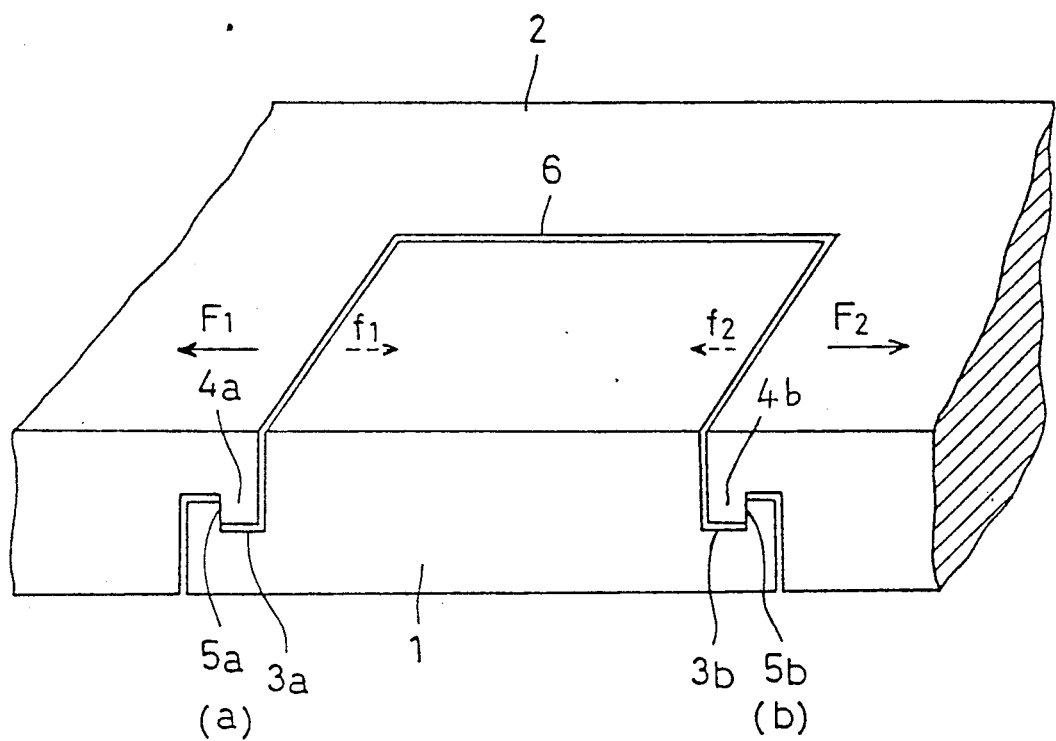
FIG. 1 is an enlarged perspective view of the coupling structure in which the present invention is worked.

FIG. 1 is a perspective view showing an embodiment of the structure of the present invention, wherein the first thermoplastic molding member 1 has a plate-like portion with recesses 3a, 3b formed on each of its end sides (a), (b), and on the other hand the second thermoplastic molding member 2 has a plate-like portion with projections 4a, 4b provided to enter into the recesses 3a, 3b. In other words, the second molding member 2 has the joining parts to lie on the joining parts of the first molding member 1 and possesses the projections on its joining parts. The interlock of projections 9a, 9b with recesses 3a, 3b provide anchoring joints for contracting or shrinking forces 71, F2. Shrinking forces F1, F2 of the second molding member 2 are as a whole produced in the opposite direction to each other, by which the projections 4a, 4b are strongly joined with the inside walls 5a, 5b of the recesses 3a, 3b.

Figure 2:
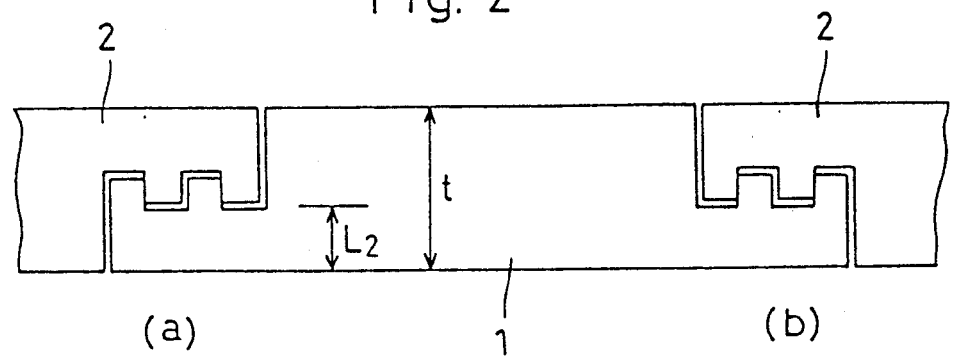
FIG. 2 is a front view of the coupling structure showing another embodiment of the present invention, FIGS. 3(i) and 3(ii) are schematic views showing another embodiment of the present invention, FIGS. 4(i) to 4(iv) are views to show a molding procedure of the coupling structure of the present invention.

The recesses 3a, 3b and the projections 4a, 4b may be formed in plural numbers respectively on each part (a), (b). FIG. 2 shows the case where they are provided two each.

The coupling structure of the present invention is applicable not only to the case of setting the first molding member 1 in the opening 6 of the second molding member 2 as in FIG. 1 but also to the case where the first and second molding members 1, 2 are arranged one on the other, as in FIGS. 3(i) and 3(ii). In FIG. 3(i), the shrinking force of the second molding member 2 is working in the direction opposite to each other between (a) and (b), and in FIG. 3(ii), in the form of shrinking as shown in arrows. Now, when one of the molding members shrinks more largely than the other, a gap is formed on one side in the uneven part as illustrated, thereby generating a coupling force due to the molding shrinkage on the opposite surface thereto. However, the gap 7 [ref. FIG. 3(ii)] is not so distinctly available as illustrated but is only in a size of a micron order. Accordingly, for practical purposes it may be considered that there is scarcely a gap. It can be said, therefore, that the coupling of FIG. 3(ii) is a state of a projection 8 of the first molding member 1 being caught in between the two projections 4a, 4b of the second molding member 2.

FIGS. 4(i) to 4(iv) show steps of realizing the above coupling structure, particularly of that shown in FIG. 1, simultaneously with molding the first and the second molding members 1, 2. Firstly, in FIG. 4(i), thermoplastic resin is injected into a first cavity 11 formed by setting die 9 to die 10, thermoplastic resin is injected to form the first molding member 1. Then, the die 10 is retracted in the rightward direction on the drawing, and the die 9 is rotated 180° around an axis 12, as shown in FIG. 4(ii). Thereafter, the die 10 is set again and thermoplastic resin is injected in a second cavity 13 [ref. FIG. 4(iii)], by which the second molding member 2 is formed around the first molding member 1. At this time, in the first cavity 11, the next first molding member 1' is being molded. Finally, only a coupled product 14 is separated as shown in FIG. 4(iv). In the above FIG. 4(iii), even under the state of the first molding member 1 not being fully solidified (i.e., the condition of not being fully cooled down), the second molding member 2 may be molded. When so made, the shrinking forces f1, f2 of the first molding member 1 in FIG. 1 are to be concerned with the coupling, thereby in general providing the stronger coupling. In realizing the coupling structure of the present invention by way of a series of operations using the same die, molding may be performed not only by the core rotation system as shown in FIGS. 4(i) to 4(iv) but also by the so-called core back system. In the latter case, the first and the second molding members are to be molded in one and the same cavity. The coupling structures of the present invention shown in FIGS. 1, 2, 3(i) and 3(ii) exhibit water-proof effect.

Figure 5A:
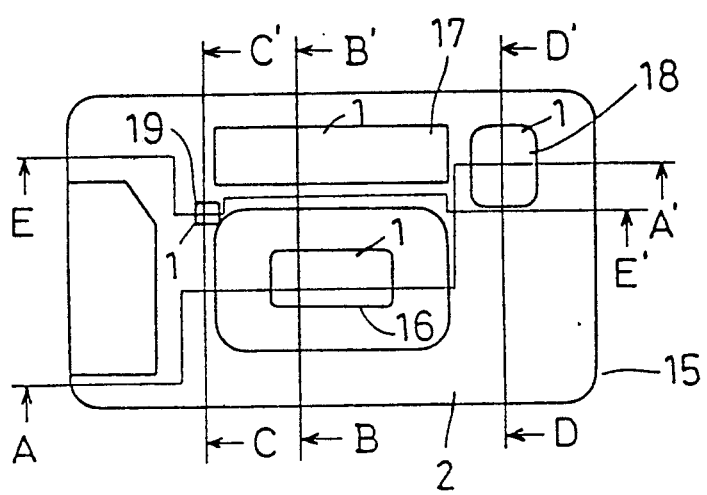
FIGS. 5(a) to 5(f), FIGS. 6(a) to 6(f), and FIGS. 7(a) to 7(f) are respectively views showing the cases where the present invention is applied to the front cover of a camera.
Figure 5C:
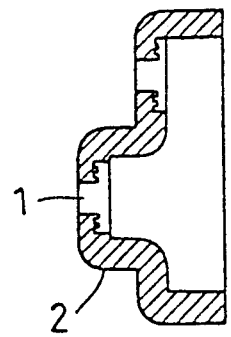
Figure 5B:
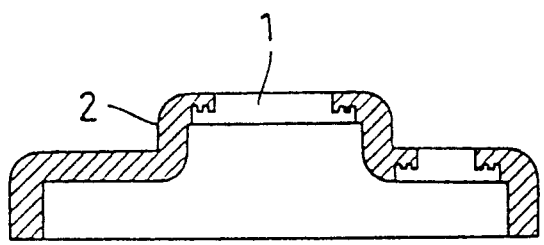
Figures 5D, 5E:
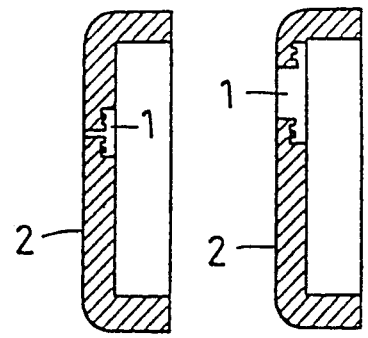
Figure 5F:
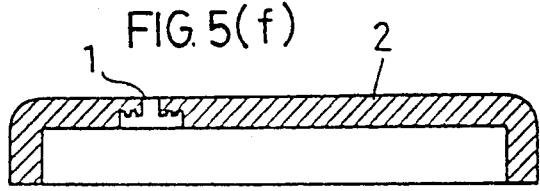

In the next embodiment explained, the present invention is applied to the coupling of a camera cover with the exterior parts thereof. Firstly, FIG. 5(a) shows a front cover 15 of a camera, being provided with a taking lens cover window 16, a view finder objective window 17, a flashing section window 18 of an electronic flash unit, a self-timer display window 19, etc. Each window is coupled with a resin molding member comprising a light transmitting material. Though the camera includes, besides the aforementioned windows, a film sensitivity display window, a light receptor lens window for automatic exposure and/or automatic focusing, etc., they are omitted from the illustration in the drawing. FIG. 5(b) is a section taken along A—A' line, FIG. 5(c) is a B—B' line section, FIG. 5(d) is a C—C' line section, FIG. 5(e) is a D—D' line section, and FIG. 5(f) is an E—E' line section, respectively of FIG. 5(a). As can be perceived from each of the sections, in FIGS. 5(a) to 5(f), the second molding member 2 constituting the front cover 15 is coupled with the first molding member 1 which constitutes a colorless or colored transparent plate in a manner as shown in the above FIG. 2 over the whole periphery of the window.

Figure 6A:
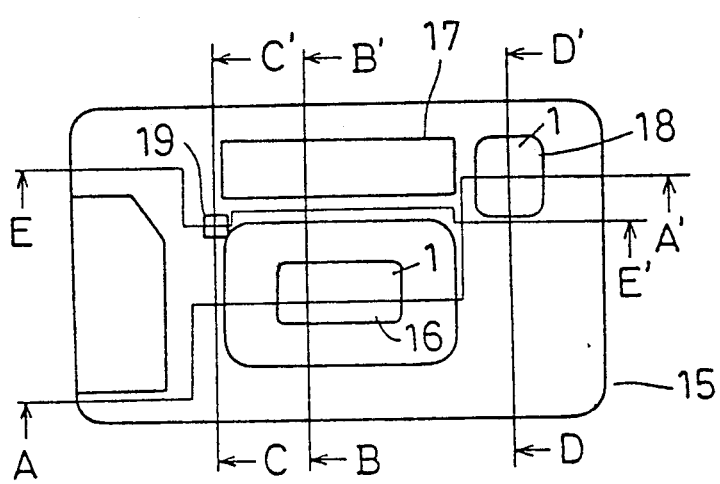
Figure 6C:
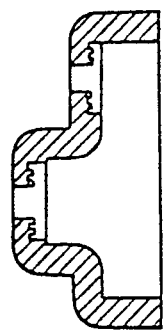
Figure 6B:
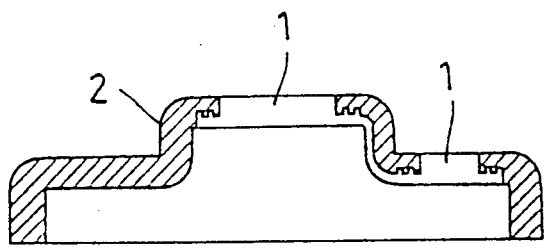
Figures 6D, 6E:
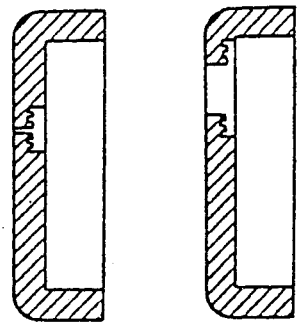
Figure 6F:
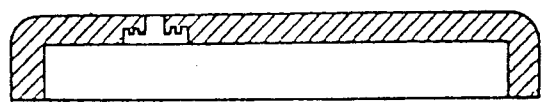
Figure 7A:
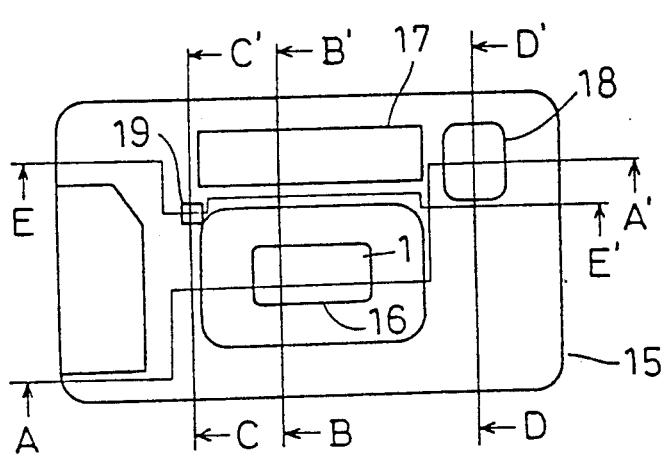
Figure 7C:
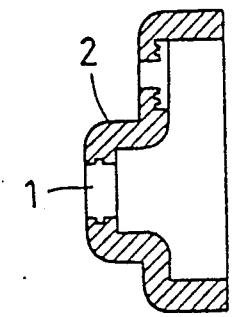
Figure 7B:
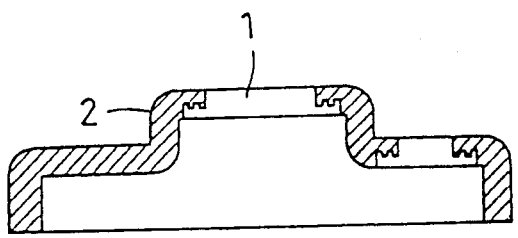
Figures 7D, 7E:
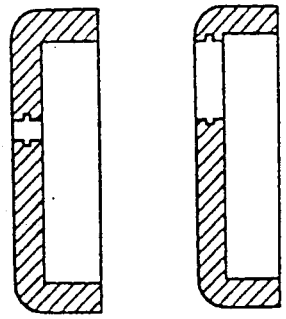
Figure 7F:
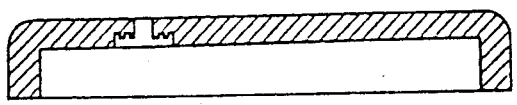

The embodiments in FIGS. 6(a) to 6(f) and 7(a) to 7(f) are respectively in accordance with FIGS. 5(a) to 5(f), and many of them are the same as those in FIGS. 5(a) to 5(f). As shown in FIG. 6(b), the first molding members 1, 1 are integrally formed as a transparent plate to be coupled with the lens cover window 16 and it is noted that the flashing section window 18 differs from FIGS. 5(a) to 5(f). In FIGS. 7(a) to 7(f), with respect to the coupling of the first molding member 1 of the lens cover window 16, the system at the right and left end parts is the same as in FIG. 5(b), but at the top and bottom end parts the coupling is made in the conventional undercut coupling system as in FIG. 7(c). In a sense, this is an example wherein the present invention structure and the conventional structure are used in mixture according to necessity in respect to the coupling of one of the first molding members 1 to the second molding member 2. It should be added that even in the case of FIGS. 7(a) to 7(f), by partly using a split type die, molding can be performed with a single die.

Figure 8A:
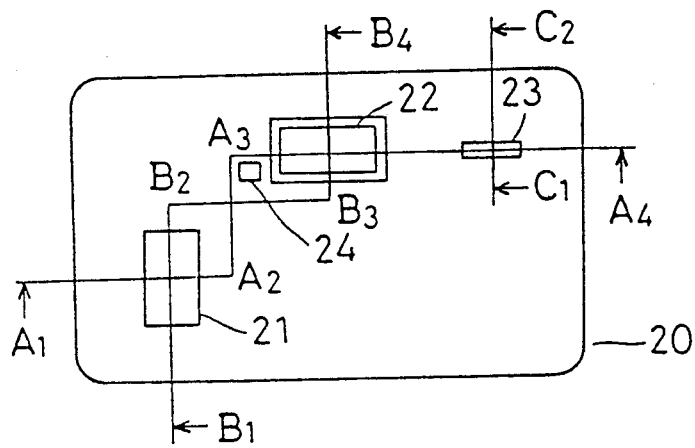
Figure 8C:
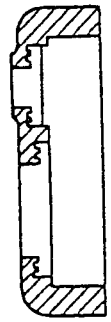
Figure 8B:
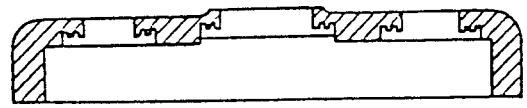
Figure 8D:

FIGS. 8(a) to 8(d) show an embodiment in which the present invention is applied to a rear cover 20 of a camera. In FIG. 8(a), the part 21 is a film identifying window, 22 a view finder eyepiece window, 23 a film advance display window, and 24 a flash unit charge completion lamp window. FIG. 8(b) is an A1-A4 line sectional view, FIG. 8(c) is a B1-B4 line sectional view, and FIG. 8(d) is a C1-C2 line sectional view. The rear cover 20 also includes a film counter window and other elements, which have been omitted in the drawing for simplification.

Figure 10A:
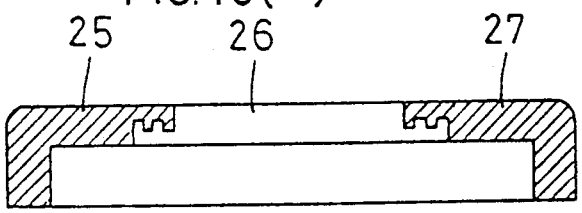
Figure 10B:
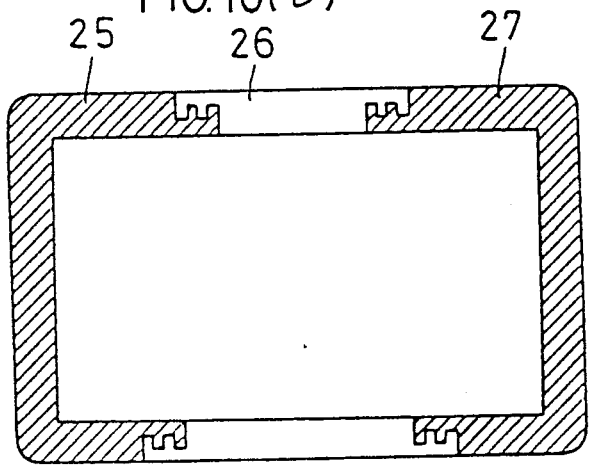

FIGS. 9(a) to 9(d) show a coupling structure in the case where the rear cover 20 of a camera is composed of three molding members 25, 26, and 27. The molding member 25 is provided with a film identifying window 21, and the molding member 26 with a view finder eyepiece window 22. FIG. 9(a) is a back view, FIG. 9(b) a plan view, FIG. 9(c) an A—A' line section, and FIG. 9(d) a B—B' line section. It may be taken here that the part 26 is the above first molding member, and 25 and 27 are the second molding members. Such a structure is particularly effective in the case where it is desired to differentiate the material qualities or colors between the part 26 and the parts 25 and 27. FIGS. 10(a) and 10(b) show the case where the unevenness relations of the coupling parts of the molding members 25, 26, and 27 are inverted from the case of FIGS. 9(a) to 9(d), and FIGS. 10(a) and 10(b) are the sectional views corresponding to FIGS. 9(c) and 9(d).

Figure 11A:
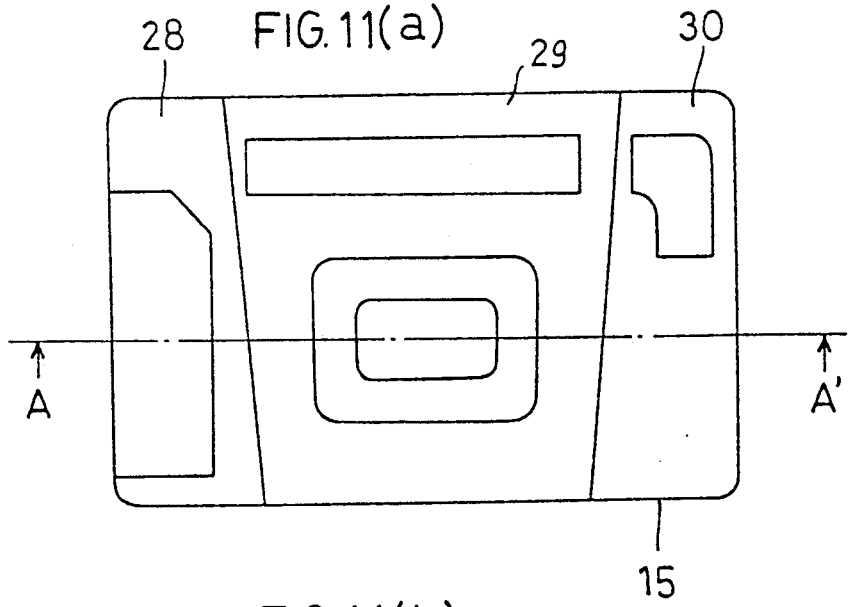
FIGS. 11(a) and 11(b) are views showing the case where the present invention is applied to the front cover of a camera.
Figure 11B:
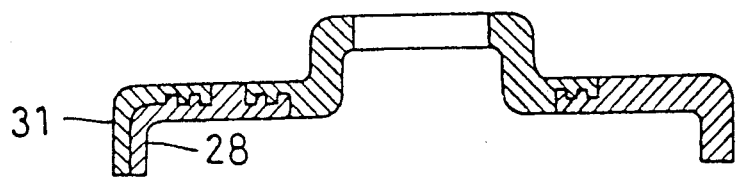

In FIGS. 11(a) and 11(b), the front cover 15 is composed of three molding members 28, 29, and 30, of which the molding member 28 is partly overlaid with a fourth molding member 31 to form a double structure. This fourth molding member 31 is used in the case where, for example, it is desired to have the colors differentiated from others for decorative purpose, or to use a material of the quality which gives a good feel to the user when contacting the holding part, etc. FIG. 11(b) is an A13 A' line section of FIG. 11(a).

Figure 12A:
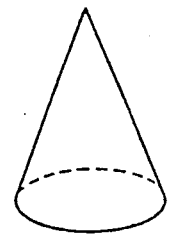
FIGS. 12(a) to 12(h) are views to exemplify various shapes of projections constituting the coupling structure of the present invention.
Figure 12B:
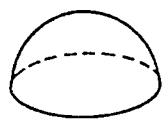
Figure 12C:
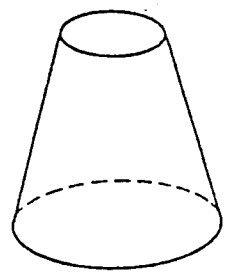
Figure 12D:
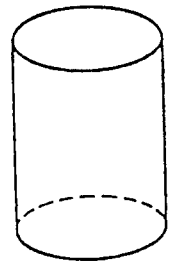
Figure 12E:
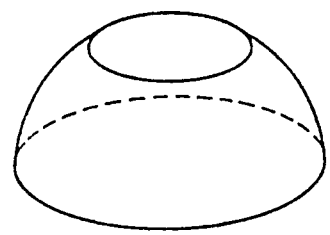
Figure 12F:
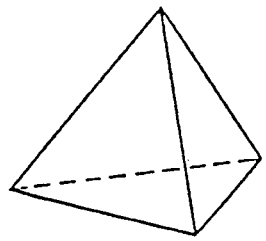
Figure 12G:
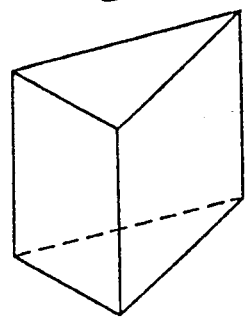
Figure 12H:
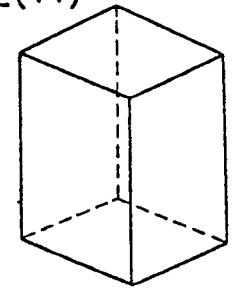

In each embodiment as illustrated above, the recess 3 and the projection 4 which are indispensable for the coupling of the two molding members may respectively have two or more joining faces. Of those, the shapes of the projection 4 will be exemplified in FIGS. 12(a) to 12(h), wherein FIGS. 12(a) and 12(b) show the cases of two faces, FIGS. 12(c) to 12(e) the cases of three faces, and FIGS. 12(f) to 12(h) the cases of multifaces.

Then, various patterns of the coupling structure of the present invention will be explained in accordance with FIGS. 13(a) to 21(c). In these figures, (a) is a plan view, (b) an A—A' line section, and (c) a B—B' line section.

FIGS. 13(a) to 13(c) show a basic type, wherein the projection 4 has a square pillar shape. Shrinkages of the first and second molding members 1 and 2 in the direction of arrow 32 yield a coupling force. In this case, depending on the material of the molding member, the shrinkage rate differs. Also, even in the case of the materials of the same quality, the shrinkage rate differs by length. Moreover, when one is molded first and the other thereafter, the shrinking force of the molding member which has been molded later has in principle a large effect upon the coupling.

In FIGS. 14(a) to 14(c), the projection 4 is of a cylindrical form, so the die can be more easily processed than the die of basic type of FIGS. 13(a) to 13(c). Its coupling force is of nearly the same degree as that of the basic type.

Figure 15A:
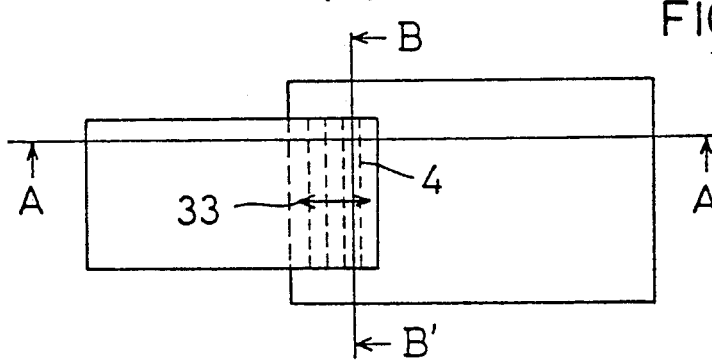
Figure 15C:
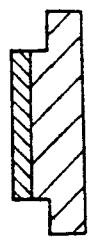
Figure 15B:
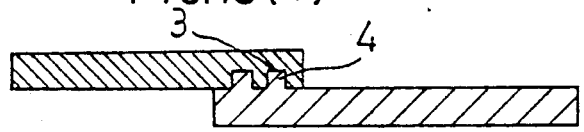

In the pattern of FIGS. 15(a) to 15(c), two line shaped coupling portions are provided. Due to the existence of the recess 3 and the projection 4 over the whole area in one direction, the coupling force in an arrow direction 33 is enlarged.

Figure 16A:
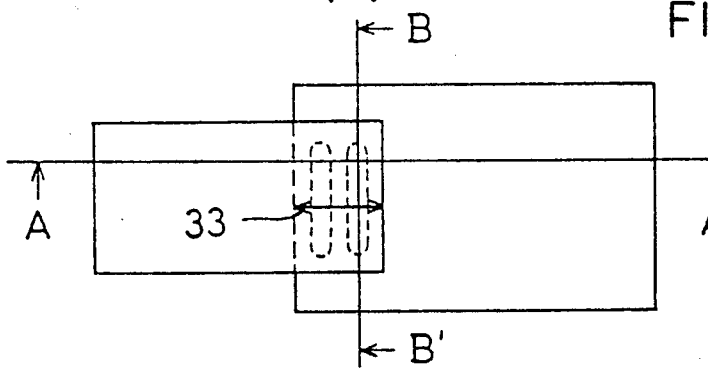
Figure 16C:
Figure 16B:
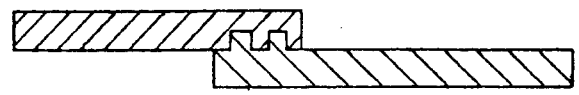

In FIGS. 16(a) to 16(c), coupling portions are formed similar to those in FIGS. 15(a) to 15(c), but the shape of each end of the recess 3 and the projection 4 is different from that of FIGS. 15(a) to 15(c), having effect against the external tensile strength in the arrow marked direction 33.

Figure 17A:
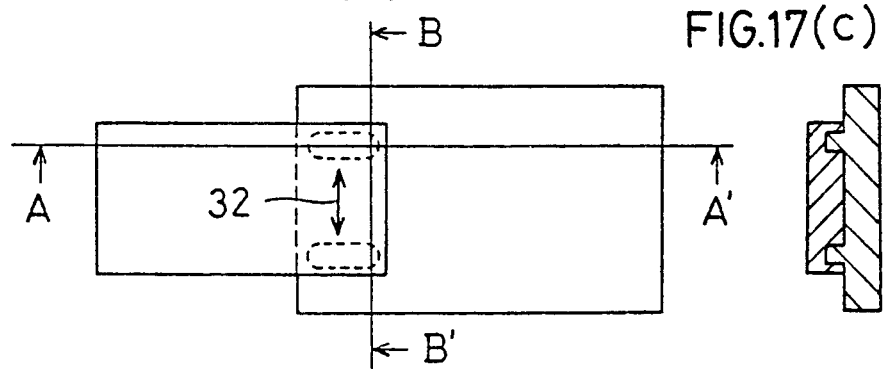
Figure 17C:
Figure 17B:
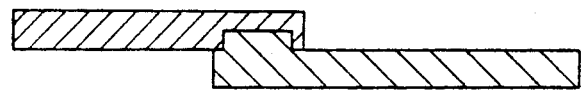

In FIGS. 17(a) to 17(c), the coupling parts are two slots, but due to the larger coupling areas than those of FIGS. 14(a) to 14(c), increased coupling forces can be expected. They are effective against the external force exerted in the direction of the arrow mark 32.

Figure 18B:
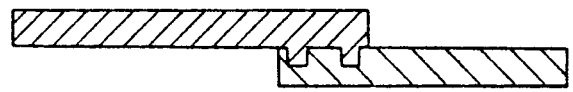
Figure 18C:
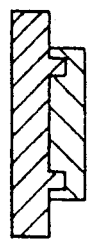
Figure 18A:
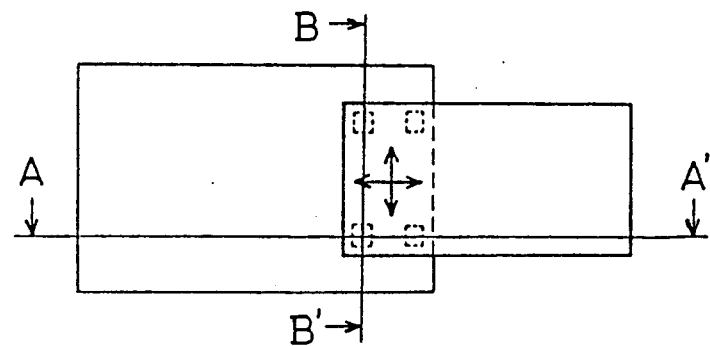

In FIGS. 18(a) to 18(c), there are more coupling parts than the basic type of FIGS. 13(a) to 13(c), and coupling surfaces due to the shrinkage in two directions, so that the coupling force is increased.

In FIGS. 19(a) to 19(c), the number of the coupling parts is the same as that of FIGS. 18(a) to 18(c), but due to the cylindrical shape, die processing is facilitated.

In FIGS. 20(a) to 20(c), the number of the coupling parts is the same as those of FIGS. 18(a) to 18(c), and FIGS. 19(a) to 19(c), but due to the slot shape, the larger coupling areas in the direction of arrow 32 can be secured, thereby allowing increased coupling force.

In FIGS. 21(a) to 21(c), the number of the coupling parts is the same as that of the basic type of FIGS. 13(a) to 13(c), but as the coupling parts are diagonally disposed, it is possible to produce the coupling forces in the two directions shown in arrows 32 and 33. Also, due to the slot shape, these coupling parts have a larger coupling force than the round grooves.

The representative resins of various existing materials for the first and second molding members 1 and 2 are given in FIG. 22.

The covers for the cameras in the above embodiment are generally colored ones, and the materials to be adapted to the windows are of the light transmitting materials. When these light transmitting materials are made of colorless-transparent materials, in the example of FIG. 22 there are available 18 kinds of combination between the colored opaque materials and the colorless-transparent materials. When the light transmitting materials are decoratively colored, there are assorted the colored opaque cover and the colored transparent window member, in which case the combination of them may vary in 36 kinds in the example of FIG. 22.

In FIG. 22, the abbreviations respectively denote the following:
PMMA: methyl polymethacrylate,
AS: acrylonitrile-styrene copolymer,
PC: polycarbonate,
ABS: acrylonitrile-butadiene-styrene resin,
POM: polyacetal (polyoxymethylene)
PBT: polybutylene terephthalate In FIG. 22, there have been given only the basic kinds of resin, each of which is basically classified as one kind irrespective of variations in the matters contained in the resin itself (such as inorganic filler, glass, carbon, etc.) or glass content therein. Besides those given in FIG. 22 there are resins to which the present invention is applicable, some examples of which may be given for application to colored materials as PMMA, PE, PP (polypropylene), and LCP (liquid crystal polymer).

An explanation will now be given on for an embodiment which provides extremely strong coupling.

Figure 23A:
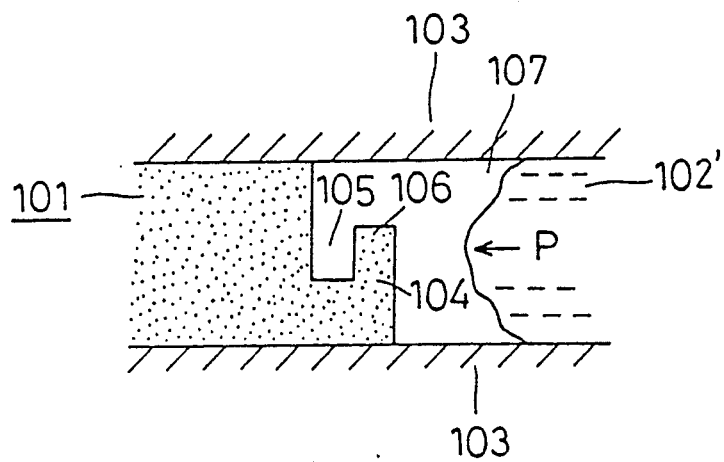
FIGS. 23(a) to 23(c) are views to show a procedure of a coupling method in another embodiment of the present invention.

In FIG. 23(a), a first member 101 is arranged in a fixed state in a die 103 for molding a second member as illustrated. This first member 101 is formed, for example, of a resin molding member, but without being limited thereto, may be formed of elastic metal, glass, or rubber. On a joining part 104 of the first member 101 there is a projection 106 provided so as to form a recess 105.

Figure 23B:
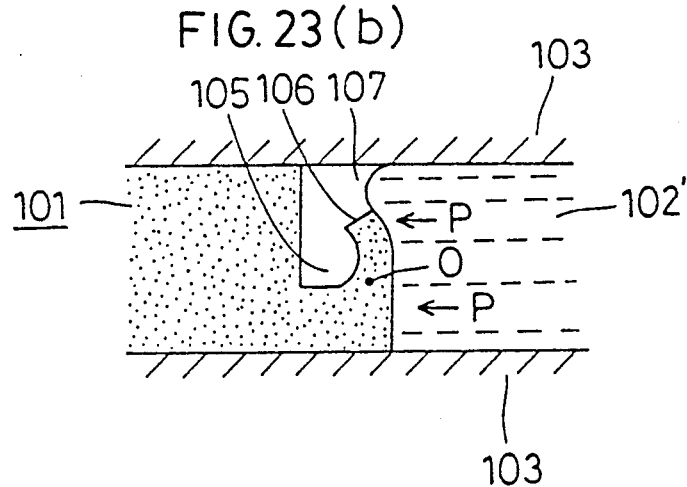

With the first member 101 fixed in the die 103, molten thermoplastic resin 102' for the second member is poured into a cavity from the right side to the left side on the drawing. In the drawing, P shows a flow pressure of the above resin 102'. As the above resin 102' has its flow pressure and high temperature/high heat at the time of molding, when it reaches the first member 101 as in FIG. 23(b), it causes to soften the projection 106 of the first member 101 to start bending it. At this time, the projection 106 shows deformation under a cantilever support centering on the point 0.

Figure 23C:
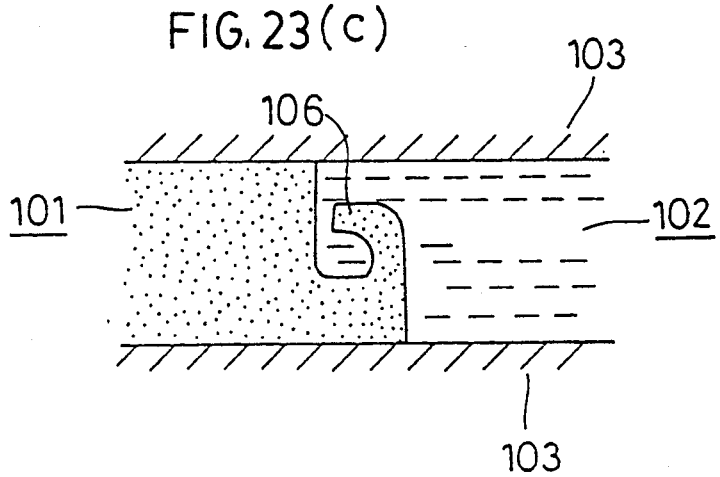

When, under the above deformed condition of the member, the resin 102' flows into the entire space and solidifies, an undercut shape is realized in the coupling part between the first member 101 and the second member 102 as in FIG. 23(c) to make the coupling between them extremely strong.

In case of practicing the above method by a core rotation system, the abovementioned procedure given in FIGS. 4(i) to 4(iv) can be utilized as it is. Of course, the above coupling can be realized by a core back system.

Figure 24:
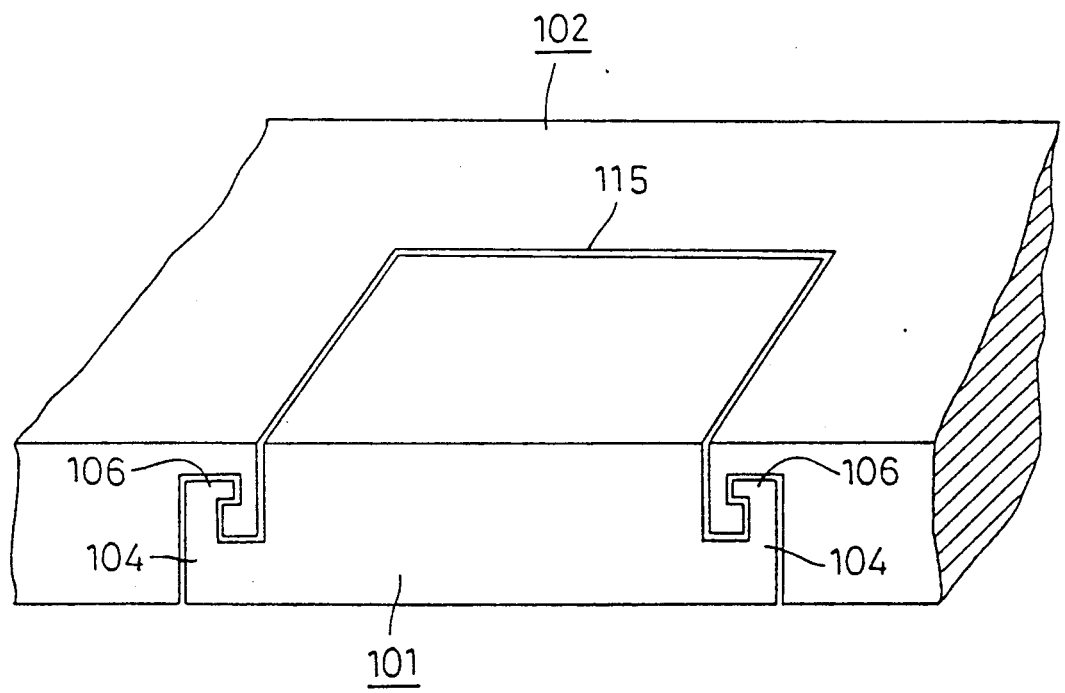
FIG. 24 is a front view of the coupling structure of a member formed in accordance with the procedure of FIGS. 23(a) to 23(c), FIGS. 25(a) to 25(f) are views to illustrate examples of the shapes prior to coupling of the first member to be offered for the method of FIGS. 23(a) to 23(c), FIGS. 26(A) to 26(F) are perspective views showing various shapes of projections which can be formed on the first member to be offered for the method of FIGS. 23(a) to 23(c), FIGS. 27(a) to 27(c) are views for illustrating the relationship between the shape of projection and the deflection amount thereof.

FIG. 24 shows a part of the product in which coupling has been achieved by the above method. In this embodiment, the first member 101 functions as a member to cap the through hole 115 of the second member 102. Accordingly, though not specifically limited thereto, when the second member 102 is used as a cover for a camera, the first member 101 may be formed into a transparent exterior part.

Figure 25A:
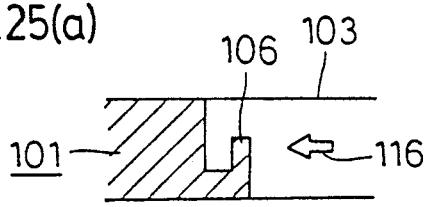
Figure 25D:
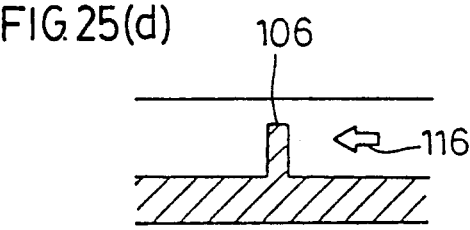
Figure 25B:
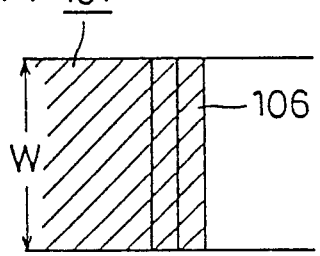
Figure 25E:
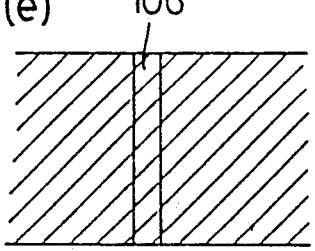
Figure 25C:
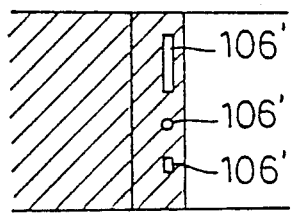
Figure 25F:
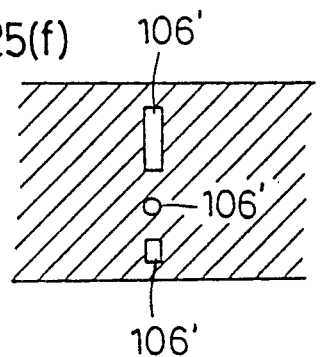
Figure 26A:
Figure 26B:
Figure 26C:
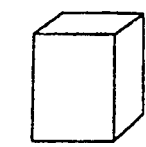
Figure 26D:
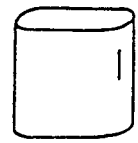
Figure 26E:
Figure 26F:
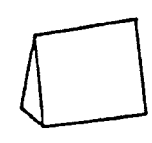

Various configurations may be designed as the shapes of the coupling part 104 and the projection 106 of the above first member 101, of which representative ones are shown in FIGS. 25(a) to 25(f) and FIGS. 26(A) to 26(F). FIGS. 25(a) to 25(f) show the condition of the first member 101 being disposed in the die 103, wherein FIGS. 25(a) and 25(d) are side sectional views, and FIGS. 25(b), 25(c), 25(e) and 25(f) are top surface views. Shaded areas respectively represent the first member 101. The arrow mark 116 shows the flow direction of the molten resin 102' for the second member shown in FIGS. 23(a) and 23(b). FIGS. 25(a) and 25(b) show the examples in which the projection 106 is formed over the same length as the width (w) of the first member 101 at one end part of the first member 101, and FIG. 25(c) shows the case where three kinds of projections 106', 106', and 106' are aligned at intervals in the widthwise direction of the first member 101. FIG. 25(d) and 25(e) show the case where the projection 106 is provided not at the end part of the first member 101 but halfway thereof, the projection 106 being formed over the full width of the member. FIG. 25(f) is an example of having arranged three kinds of projections 106', 106', and 106' instead of the projection 106 of FIG. 25(e). While the examples of configurations of the projection are shown in FIGS. 26(A) to 26(F), these projections are to be deformed in molding the second member to provide an undercut structure at the joining part.

Figure 27A:
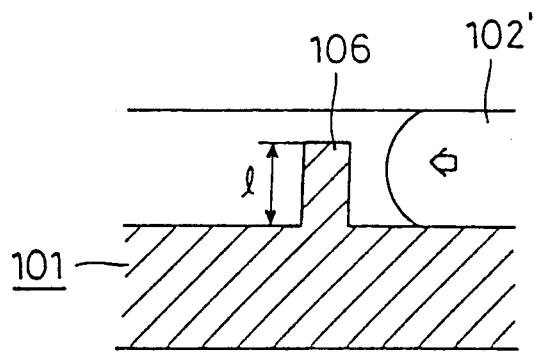
Figure 27C:
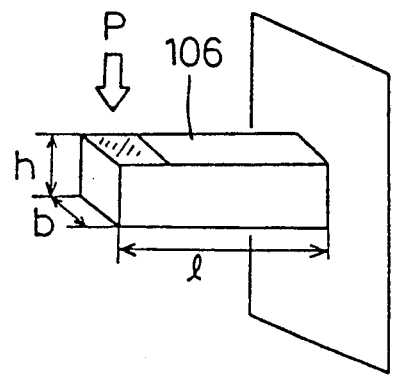
Figure 27B:
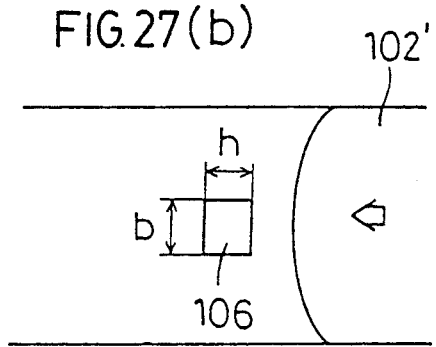

Then, the relation of the above projection with the deflection amount is explained with reference to the example of FIGS. 27(a) to 27(c). When, as shown in FIGS. 27(a) to 27(c), the projection 106 is assumed to be of a rectangular prism having a length of b, width of h, and a height of 1, on exertion of a flow pressure P of resin 102', the deflection amount δ becomes:

$$\delta = \frac{Pl^3}{3EI}$$

where I is a secondary moment of the section.

And the secondary moment I of the section becomes:

$$I = \frac{bh^3}{12}$$

where, E is the actual flexural elastic constant. Now, in the case of using PC (polycarbonate) resin as the first member 101 and ABS (acrylonitrile.butadiene.styrene) resin as the second member and further setting the following conditions to be: b=h=1 mm, l=2.5 mm, and P=200 kgf/cm², the deflection amount δ is obtained with variation of the temperature T at the coupling part of the first member 101, as follows:

| When T = 20° C., | δ = 0.50 mm |
|---|---|
| When T = 100° C., | δ = 0.63 mm |
| When T = 200° C., | δ = 0.83 mm |

Figure 28:
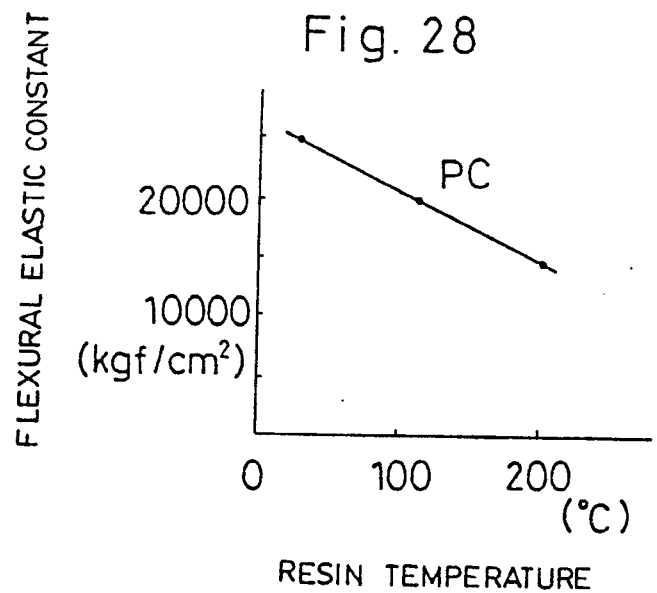
FIG. 28 is a view to show the relationship between the resin temperature of the resin used and the flexural elastic constant.

FIG. 28 shows the relation between the temperature of the polycarbonate used as a material for the above first member 101 and the flexural elastic constant.

As the materials for each of the above members, almost all combinations of thermoplastic resins including the abovementioned PC, ABS, ABS+PS, AS (acrylonitrile.styrene copolymer), PMMA (methyl polymethacrylate), PBT (polybutylene terephtalate), POM (polyoxymethylene), etc. and elastomers of olefin, urethane, ester, etc. can be used. However, the thermal deformation temperature $T_A$ of the first member 101 must be higher than the molding die temperature $T_{KB}$ of the second member. Accordingly, the resin molding materials must be selected so as to satisfy the conditions: $T_A > T_{KB}$. Examples of such combinations are shown in the following table.

|   | Material of 1st member | Material of 2nd member |
|---|---|---|
| 1 | PC | ABS |
| 2 | PC | PMMA |
| 3 | PBT | ABS |

As previously stated, as the materials for the first member, there may be usable metal, glass, rubber, etc.

Figure 29:
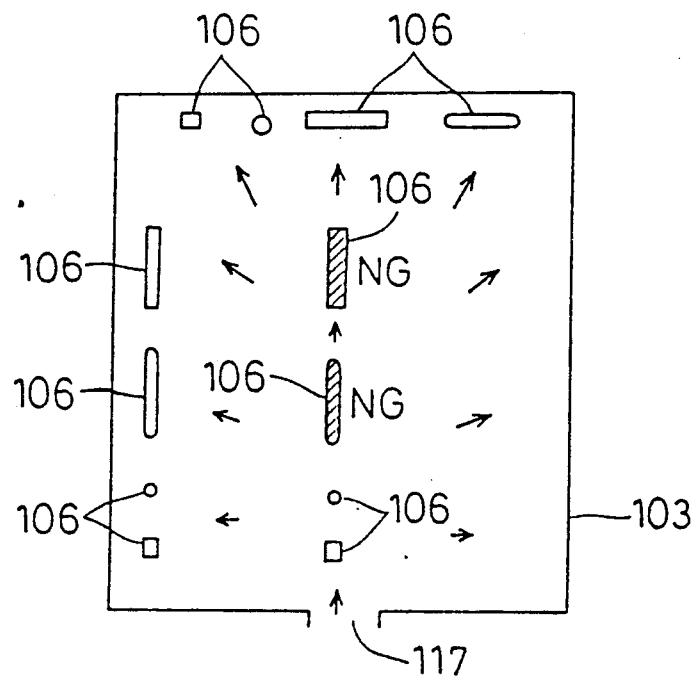
FIG. 29 is a view to show the relationship between the direction of flow of the resin and the realization of the bend of the projection.
Figure 30:
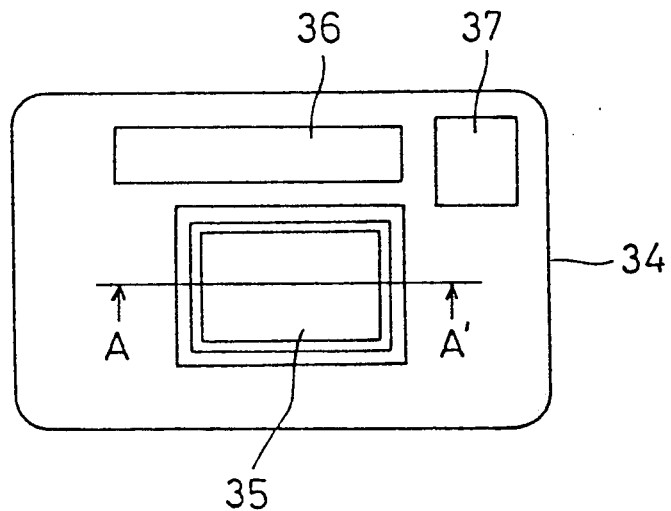
FIG. 30 is a front view of the front cover of a camera made under a conventional coupling structure.
Figure 31A:
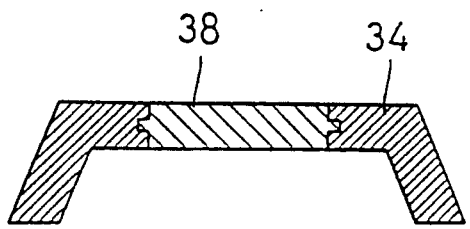
FIGS. 31(a) to 31(d) show examples of various coupling structures with reference to the A-A' line sectional view of FIG. 30.
Figure 31C:
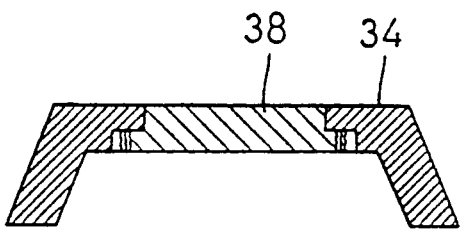
Figure 31B:
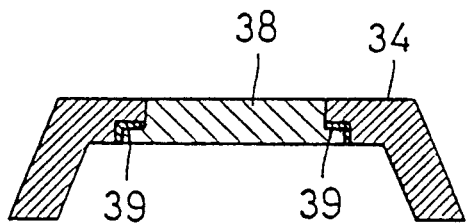
Figure 31D:
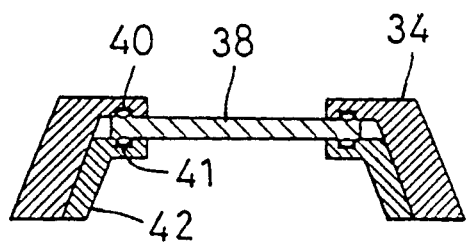
Figure 32:
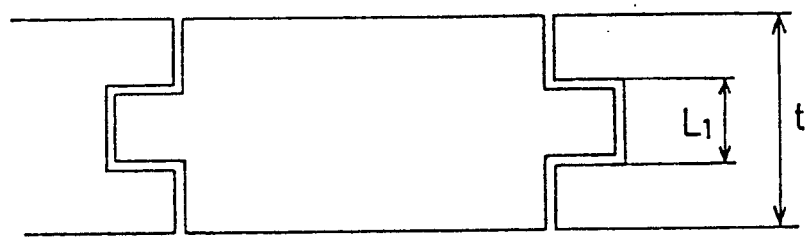
FIG. 32 is an illustrative view of a conventional embodiment.

Finally, FIG. 29 shows the results of review as to whether acceptable deformation of the projection 106 in the direction of flow of the resin shown in an arrow is obtainable or not according to the position and shape of the projection 106. When the deformation of projection at each position is acceptable to the resin which has run in from a gate 117 of the die 103, the areas are shown in blank, and when unacceptable or no deformation is obtainable, the areas are shown as a shaded zone.

While the invention has been described above in line with preferred embodiments, it is to be understood that the present invention is not to be limited to those embodiments but various alterations and modifications are feasible within the scope not to diverge from the purpose of the invention as described in the claims.

What is claimed is:

1. A coupling structure of resin molding members including first and second members having, respectively, first and second plate portions, said coupling structure, in a cross-sectional view, comprising:
    a first projection projected from an end of said first plate portion in a direction along a direction of said first plate portion;
    a first hook portion projected from said first projection in a direction transverse to the direction of said plate portion, thereby providing a first recess between the end of said first plate portion and said first hook portion;
    a second projection projected from an end of said second plate portion in a direction along a direction of said second plate portion; and
    a second hook portion projected from said second projection in a direction transverse to the direction of said plate portion, thereby providing a second recess between the end of said second plate portion and said second hook portion;
    wherein said first hook portion is fitted into said second recess and said second hook portion is fitted into said first recess.

2. A coupling structure of resin molding members including first and second members having, respectively, first and second plate portions, said coupling structure, in a cross-sectional view, comprising:
    a first projection projected from an end of said first plate portion in a direction along a direction of said first plate portion;
    a first hook portion projected from said first projection in a direction transverse to the direction of said plate portion, thereby providing a first recess between the end of said first plate portion and said first hook portion;
    a second hook portion projected from said first projection in a direction transverse to the direction of said plate portion, thereby providing a second recess between said first hook portion and said second hook portion;
    a second projection projected from an end of said second plate portion in a direction along a direction of said second plate portion; and
    a third hook portion projected from said second projection in a direction transverse to the direction of said plate portion, thereby providing a third recess between the end of said second plate portion and said third hook portion; and
    a fourth hook portion projected from said second projection in a direction transverse to the direction of said plate portion, thereby providing a fourth recess between said third hook portion and said fourth hook portion;
    wherein said first hook portion is fitted into said fourth recess, said second hook portion is fitted into said third recess, said third hook portion is fitted into said second recess, and said fourth hook portion is fitted into said first recess.

3. A coupling structure of resin molding members, said coupling structure comprising:
    a first member having a first plate portion;
    a first projection projected from a plate surface of said first plate portion in a direction transverse to a direction of said first plate portion;
    a second projection projected from the plate surface of said first plate portion in a direction transverse to the direction of said first plate portion at a position with a certain distance from said first projection and being paired with said first projection;
    a second member having a second plate portion;
    a first recess provided at a plate surface of said second plate portion in a direction transverse to a direction of said second plate portion; and
    a second recess provided at the plate surface of said second plate portion in a direction transverse to the direction of said second plate portion at a position with a complementary certain distance from said first recess and being paired with said first recess;
    wherein one pair of said pair of projections and said pair of recesses catch the other pair tightly therebetween in the direction of said first plate portion.

4. A coupling structure according to claim 3, wherein at least one of said first and second members is molded with a thermoplastic material.

5. A coupling structure according to claim 3, wherein one of said first and said second members is formed to have an opening at a designated part, and the other member is formed to block the opening in a waterproof manner, and the recesses and the projections are so arranged as to continuously surround the whole periphery of said opening.

6. A coupling structure according to claim 5, wherein the other member is composed of a light transmitting material.

7. A coupling structure according to claim 6, wherein the light transmitting material is a transparent material.

8. A coupling structure according to claim 6, wherein the light transmitting material is a colored material.

9. A coupling structure according to claim 6, wherein said one member is composed of a light shielding material and said one member constitutes an outer surface of the structure.

10. A coupling structure according to claim 5, wherein said one member is a cover having holes therein of a camera, and the other member is an exterior part for blocking the holes provided on said cover.

11. A coupling structure of resin molding members including first and second members, said first member having a first plate portion, said coupling structure, in a cross-sectional view, comprising:
a first projection projected from one end of said first plate portion in a direction along a direction of said first plate portion;
a first hook portion projected from said first projection in a direction transverse to the direction of said first plate portion;
a second hook portion projected from said first hook portion toward said one end of said first plate portion, thereby providing a first L-shaped recess among said first plate portion, said first projection, said first hook portion, and said second hook portion;
a second projection projected from another end of said first plate portion in a direction along a direction of said first plate portion;
a third hook portion projected from said second projection in a direction transverse to the direction of said first plate portion;
a fourth hook portion projected from said third hook portion toward said another end of said first plate portion, thereby providing a second L-shaped recess among said first plate portion, said second projection, said third hook portion, and said fourth hook portion; and
the second member having a first complementary portion which fills said first L-shaped recess and a second complementary portion which fills said second L-shaped recess.

12. A coupling structure according to claim 11, wherein at least one of said first and second members is molded with a thermoplastic material.

13. A coupling structure according to claim 11, wherein one of said first and second members is formed to have an opening at a designated part, and the other member is formed to block the opening in a waterproof manner, and the recesses and the projections are so arranged as to continuously surround the whole periphery of said opening.

14. A coupling structure according to claim 13, wherein the other member is composed of a light transmitting material.

15. A coupling structure according to claim 14, wherein the light transmitting material is a transparent material.

16. A coupling structure according to claim 14, wherein the light transmitting material is a colored material.

17. A coupling structure according to claim 14, wherein said one member is composed of a light shielding material and said one member constitutes an outer surface of the structure.

18. A coupling structure according to claim 13, wherein said one member is a cover having holes therein of a camera, and the other member is an exterior part for blocking the holes provided on said cover.

19. A coupling structure of resin molding members including first and second members having, respectively, first and second plate portions, said coupling structure, in a cross-sectional view, comprising:
a first projection projected from one end of said first plate portion in a direction along a direction of said first plate portion;
a first hook portion projected from said first projection in a direction transverse to the direction of said plate portion, thereby providing a first recess between the end of said first plate portion and said first hook portion;
a second projection projected from another end of said first plate portion in a direction along a direction of said first plate portion; and
a second hook portion projected from said second projection in a direction transverse to the direction of said first plate portion, thereby providing a second recess between the end of said second plate portion and said second hook portion;
a first complementary portion provided in said second member which fills said first recess; and
a second complementary portion provided in said second member which fills said second recess.

20. A coupling structure according to claim 19, wherein at least one of said first and second members is molded with a thermoplastic material.

21. A coupling structure according to claim 19, wherein one of said first and said second members is formed to have an opening at a designated part, and the other member is formed to block the opening in a waterproof manner, and the recesses and the projections are so arranged as to continuously surround the whole periphery of said opening.

22. A coupling structure according to claim 21, wherein the other member is composed of a light transmitting material.

23. A coupling structure according to claim 22, wherein the light transmitting material is a transparent material.

24. A coupling structure according to claim 22, wherein the light transmitting material is a colored material.

25. A coupling structure according to claim 22, wherein said one member is composed of a light shielding material and said one member constitutes an outer surface of the structure.

26. A coupling structure according to claim 21, wherein said one member is a cover having holes therein of a camera, and the other member is an exterior part for blocking the holes provided on said cover.

27. A coupling structure of resin molding members including first and second members having, respectively, first and second plate portions, said coupling structure, in a cross-sectional view, comprising:
a first projection projected from one end of said first plate portion in a direction along a direction of said first plate portion;
a first hook portion projected from said first projection in a direction transverse to the direction of said first plate portion, thereby providing a first recess between the one end of said first plate portion and said first hook portion;

a second hook portion projected from said first projection in a direction transverse to the direction of said first plate portion, thereby providing a second recess between said first hook portion and said second hook portion;

a second projection projected from another end of said first plate portion in a direction along the direction of said first plate portion;

a third hook portion projected from said second projection in a direction transverse to the direction of said first plate portion, thereby providing a third recess between the other end of said first plate portion and said third hook portion;

a fourth hook portion projected from said second projection in a direction transverse to the direction of said first plate portion, thereby providing a fourth recess between said third hook portion and said fourth hook portion;

a first complementary portion provided in said second member which fills said first recess;

a second complementary portion provided in said second member which fills said second recess;

a third complementary portion provided in said second member which fills said third recess; and a fourth complementary portion provided in said second member which fills said fourth recess.

28. A coupling structure according to claim 27, wherein at least one of said first and second members is molded with a thermoplastic material.

29. A coupling structure according to claim 27, wherein one of said first and second members is formed to have an opening at a designated part, and the other member is formed to block the opening in a waterproof manner, and the recesses and the projections are so arranged as to continuously surround the whole periphery of said opening.

30. A coupling structure according to claim 29, wherein the other member is composed of a light transmitting material.

31. A coupling structure according to claim 30, wherein the light transmitting material is a transparent material.

32. A coupling structure according to claim 30, wherein the light transmitting material is a colored material.

33. A coupling structure according to claim 30, wherein said one member is composed of a light shielding material and said one member constitutes an outer surface of the structure.

34. A coupling structure according to claim 29, wherein said one member is a cover having holes therein of a camera, and the other member is an exterior part for blocking the holes provided on said cover.

* * * * *